Dec. 29, 1970  G. A. HUGHES ET AL  3,551,459
13-METHYL-8-ISOGONANES
Filed April 15, 1965  2 Sheets-Sheet 1

INVENTORS
GORDON A. HUGHES
HERCHEL SMITH
BY *Vito Victor Bellino*
ATTORNEY

Dec. 29, 1970 G. A. HUGHES ET AL 3,551,459
13-METHYL-8-ISOGONANES
Filed April 15, 1965 2 Sheets-Sheet 2

INVENTORS
GORDON A. HUGHES
HERCHEL SMITH
BY Upto Upton Bellino
ATTORNEY

United States Patent Office 3,551,459
Patented Dec. 29, 1970

3,551,459
13-METHYL-8-ISOGONANES
Gordon A. Hughes, Wayne, Pa., and Herchel Smith, 500 Chestnut Lane, Wayne, Pa. 19807; said Hughes assignor to said Smith
Filed Apr. 15, 1965, Ser. No. 448,417
Int. Cl. C07c 169/20
U.S. Cl. 260—397.4      3 Claims

ABSTRACT OF THE DISCLOSURE

The total synthesis of 13-methyl-8-isogonanes unsaturated at the 5(10)-position and bearing an alkynyl and an oxygen function at the 17-position is described. The products possess varying hormone effects in animals and in particular are active progestational agents.

This invention relates to compositions of matter classified in the art of chemistry as substituted unsaturated 8-isogonane derivatives, to intermediates therefor, and to processes for making and using such compositions.

In describing the invention, reference will be made in the following specification to the annexed drawings, wherein.

Figure 5:
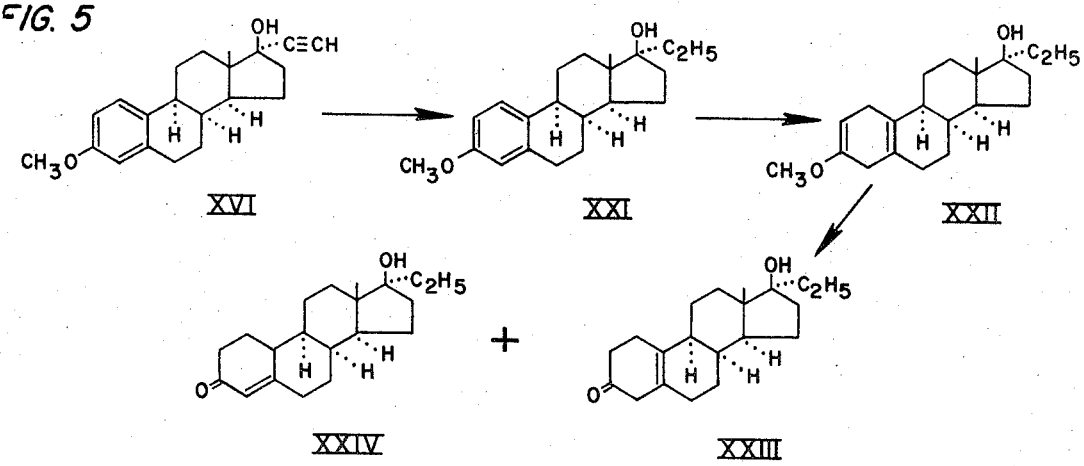

FIG. 5 illustrates schematically the reaction sequence for preparing a mixture of a 17-alkyl-13-methyl-8-isogon-4-en-17-ol and a 17-alkyl-13-methyl-8-isogon-5(10)-en-17-ol from a 13-methyl-17-alkynyl-3-alkoxy-8-isogona 1,3,5(10)-trien-17-ol, specifically 17α-ethyl-13β-methyl-17β-hydroxy-8-isogon-5(10)-en-3-one and 17α-ethyl-13β-methyl-17β-hydroxy-8-isogon-4-en-3-one from 13β-methyl-17α-ethynyl-3-methoxy-8-isogona-1,3,5(10)-trien-17β-ol.

The invention sought to be patented in a principal composition aspect is described as reading in the concept of an unsaturated 13-methyl-8-isogonane having attached thereto in the 17-position a saturated or unsaturated alkyl group and also having attached thereto oxygen functions in the 3-position and the 17-position.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent applied use characteristics of exerting qualitatively varying hormonal effects in animals as evidenced by pharmacological evaluation according to standard test procedures. Such tangible embodiments show estrogenic, androgenic, anti-estrogenic, progestational, and blood lipid effects, anabolic actions, salt retention, salt excretion and central nervous system effects. This finding indicates their usefulness in the treatment of female hypogonadism, emenorrhea, dysmenorrhea, ovulation block, functional uterine bleeding, acne, osteoporosis, infertility, and habitual abortion, and in contraception, pregnancy maintenance, promotion of weight gain and nitrogen retention, growth stimulation, post operative recovery, healing of wounds, and healing of burns. In particular it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal 8-isogonane compositions of the invention according to the sequence of reactions described herein.

Figure 1:
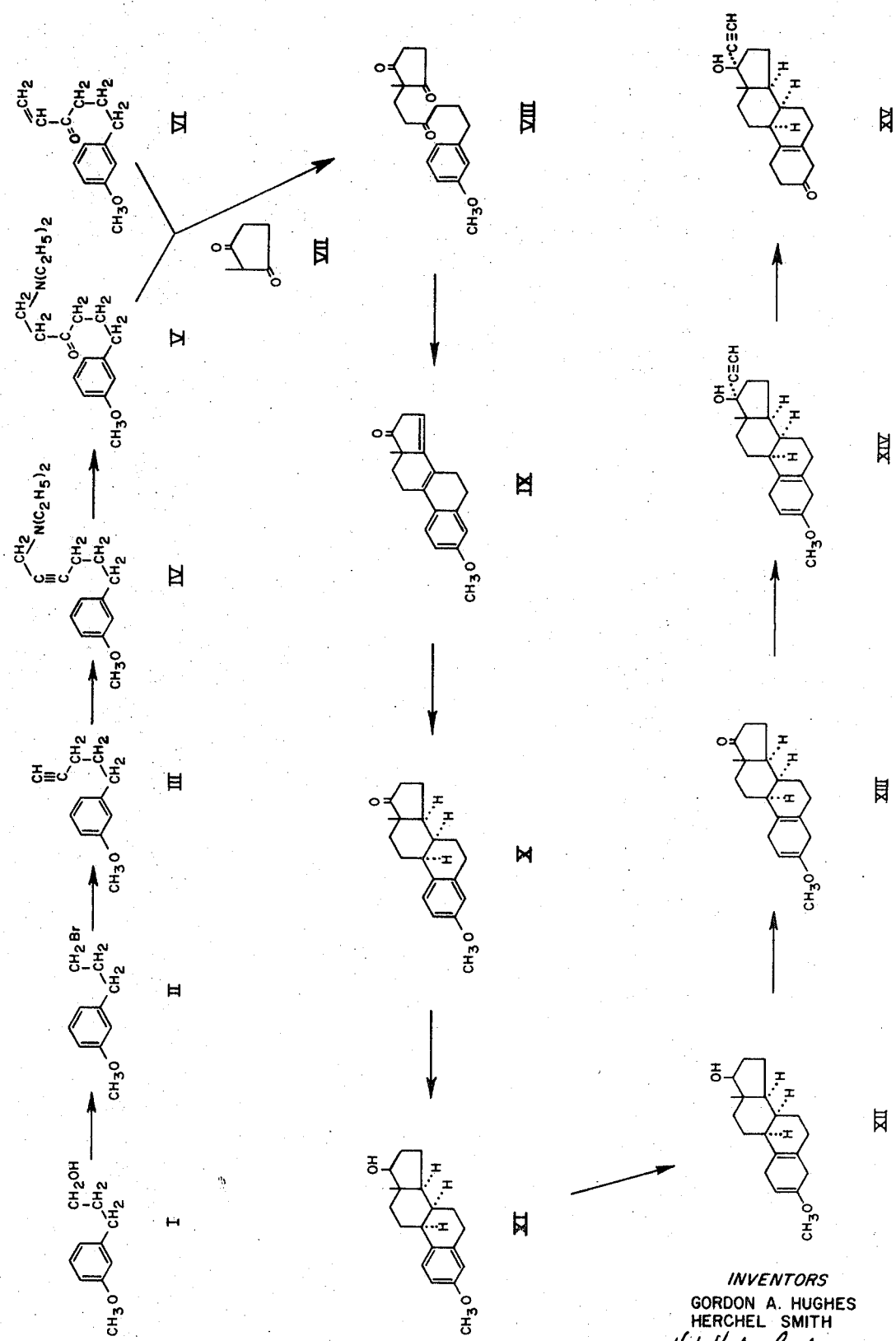
FIG. 1 illustrates schematically the reaction sequence for preparing a 13-methyl-8-isogon-5(10)-ene, specifically 13β-methyl-17α-ethynyl-17β-hydroxy-8-isogon-5(10)-en-3-one XV.

The invention sought to be patented in a second composition aspect is described as residing in the concept of a 13-methyl-8-isogona-2,5(10)-dien having attached thereto in the 3-position and the 17-position an oxygen function (FIG. 1, XII, XIII, XIV).

The tangible embodiments of said second composition aspect possess the use characteristic of exerting hormonal effects as evidenced by standard test procedures. Furthermore, said tangible embodiments of said second composition aspect possess the use characteristic of being intermediates for the preparation of compositions exerting hormonal effects as evidenced by standard test procedures.

The invention sought to be patented in a third composition aspect is described as residing in the concept of a 13-methyl-8-isogon-5(10)-ene having attached thereto in the 17-position a saturated or unsaturated alkyl group and also having oxygen functions attached in the 3-position and the 17-position (FIG. 1, XV).

The tangible embodiments of said third composition aspect possess the use characteristic of exerting hormonal effects as evidenced by standard test procedures.

The invention sought to be patented in a fourth composition of matter is described as residing in the concept of a mixture of a 13-methyl-8-isogon-4-ene having attached thereto in the 3-position and the 17-position an oxygen function and in the 17-position an alkyl group with its $\Delta^{5(10)}$ isomer.

The tangible embodiments of said fourth composition aspect possess the use characteristic of exerting hormonal effects as evidenced by standard test procedures.

Figure 2:
FIG. 2 illustrates schematically the reaction sequence for preparing a 17-alkynyl-13-methyl-3-methoxy-8-isogona-1,3,5(10)-triene from a 13-methyl-3-methoxy-8-isogona-1,3,5(10)-trien-17-one, specifically 13β-methyl-17α-ethynyl-3-methoxy-8-isogona-1,3,5(10)-trien - 17β-ol from 13β-methyl-3-methoxy-8-isogona-1,3,5(10) - trien-17-one.
Figure 3:
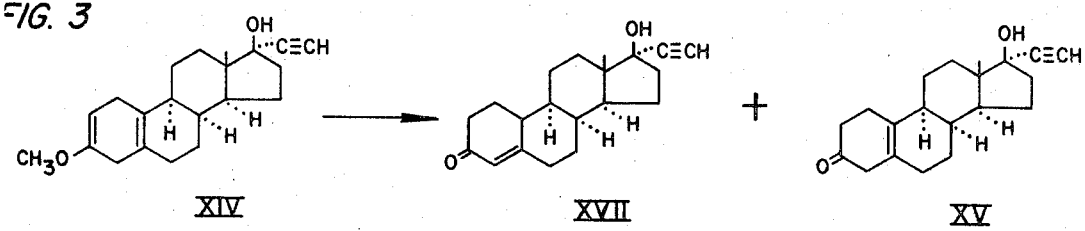
FIG. 3 illustrates schematically the mineral acid hydrolysis of a 13-methyl-8-isogona-2,5(10)-diene to a mixture of a 13-methyl-8-isogon-4-ene and a 13-methyl-8-isogon-5(10)-ene, specifically 17α-ethynyl-13β-methyl-3-methoxy-8-isogona-2,5(10-dien-17β-ol to 17α-ethynyl-13β-methyl-17β-hydroxy-8-isogon-4-en-3-one and 17α-ethynyl-13β-methyl-17β-hydroxy-8-isogon-5(10)-en-3-one.

The invention sought to be patented in a sub-generic composition aspect is described as residing in the concept of a 13-methyl-3-alkoxy - 17 - alkynyl - 8 - isogona-1,3,5(10)-trien-17-ol (FIG. 2; XVI) of which a specific embodiment, 13β-methyl-3-methoxy-17α-ethynyl - 8 - isogona-1,3,5(10)-trien-17β-ol, is hereinafter described.

The tangible embodiments of said sub-generic composition aspect possess the use characteristic of varying hormone effects in animals, as evidenced by pharmacological evaluation by standard test procedures and in particular have demonstrated a high pituitary blocking activity, coupled with an unexpected separation of activities.

The invention sought to be patented in a second subgeneric composition aspect is described as residing in the concept of a 13-methyl-17-alkynyl-8-isogon-5(10)-en-3-one (FIG. 1; XV) of which a specific embodiment, 13β-methyl-17α-ethynyl - 8 - isogon-5(10)-en-3-one, is hereinafter described.

The tangible embodiments of said second sub-generic composition aspect possess the use characteristic of varying hormone effects in animals, as evidenced by pharmacological evaluation by standard test procedures, and in particular in certain instances pituitary blocking effects accompanied by unexpected separation of activities.

As used herein, the term "oxygen function" means oxo, hydroxy, or a carbon containing group attached through oxygen to the positions hereinbefore specified. Thus, when the A-ring is aromatic the "oxygen function" at position 3 can include hydroxy, an ester substituent derived from the hydroxyl group and an inorganic acid, alkoxy, and acyloxy. The alkoxy group can be saturated or unsaturated, among which are for purposes of illustration, but without limiting the generality of the foregoing: methoxy, ethoxy, propoxy, isopropoxy, cyclopentyloxy, and heptyloxy, or: propenyloxy, heptenyloxy, heptynyloxy, benzyloxy and phenoxy; the alkoxy group can itself be substituted: 2,3-dihydroxypropoxy, p-nitrobenzyloxy, and dimethylaminoethoxy, and contain a heterocyclic ring such as pyranyloxy; and, similarly, the acyloxy group can be saturated or unsaturated: acetoxy, propionoxy, menthoxyacetoxy, cyclopentoyloxy, and heptoyloxy, or: propenoyloxy, 10-undecenoyloxy, benzoyloxy, benzene sulfonyloxy, and β-phenylpropionyloxy, and can itself be substituted: trifluoroacetoxy, p-nitrobenzoyloxy, hemisuccinoyloxy, p-toluenesulfonyloxy, and contain a heterocyclic ring, for example nicotinoyloxy. The ester substituent formed from the 3-hydroxyl group and an inorganic acid can be derived from a monobasic acid (for example, nitrate) or from a dibasic or polybasic acid (for example, hydrogen sulphate, dihydrogen phosphate). When the ester substituent contains an acidic hydrogen atom, it can be neutralized with an organic or inorganic base to form the corresponding salt (for example, the sodium salt or the ethanolamine salt of the hydrogen sulfate ester). When the 8-isogonane structure has an hydroaromatic A-ring, the "oxygen function" at position 3 can be oxo, dialkoxy (for example, dimethoxy), alkylenedioxy (for example, ethylenedioxy) and alkylenethiooxy (for example, ethylenethiooxy). When the 8-isogonane nucleus carries a 17-alkyl group the "oxygen function" at C–17 can be hydroxy, acyloxy (defined as above) and alkoxy (for example, methoxy, tetrahydropyranyloxy). For compounds of the invention possessing no alkyl substituent at the 17-position the oxygen function at C–17 can also be oxo, dialkoxy (for example, dimethoxy), alkylenedioxy (for example, ethylenedioxy) and alkylenethiooxy (for example, ethylenethiooxy). The substituent can also be an ester substituent derived from hydrogen sulphate, dihydrogen phosphate, or salts derived therefrom (for example, potassium or ethanolamine salt of the hydrogen sulphate ester).

As used herein the term "alkyl" means saturated alkyl radicals, including the straight chain radicals, such as methyl, ethyl, propyl, butyl, hexyl, decyl, dodecyl, octadecyl, the branched chain open-ring or cyclic radicals on which branching occurs on the β- or subsequent carbon such as iso-butyl, iso-pentyl, cyclohexylmethyl, unsaturated alkyl radicals, such as vinyl, ethynyl, isopropenyl, hexadecenyl; and includes such radicals when substituted with halogen, such as chloroethynyl, bromopropyl.

The manner and process of making and using the invention will now be generally described so as to enable a person skilled in the art of chemistry to make and use the same, as follows:

Referring now to FIG. 1, wherein the compounds are assigned Roman numerals for identification schematically, the sequence of reactions involved in the synthesis of a specific embodiment, namely, 13β-methyl-17α-ethynyl-17β-hydroxy-8-isogon-5(10)-en-3-one is illustrated. 3-(m-methoxyphenyl)propanol (I) is heated with phosphorus tribromide in benzene after dropwise addition in the cold, to form 3-(m-methoxyphenyl)propyl bromide (II). This halogen compound (II) dissolved in tetrahydrofuran is condensed with sodium acetylide in liquid ammonia to obtain 5-(m-methoxyphenyl)-1-pentyne (III). Compound (III) is allowed to stand under nitrogen with water, 30% formalin, acetic acid, diethylamine, dioxane, and cuprous chloride at 70° C. for about 12 hours, whereby there is obtained 1-diethylamino-6-(m-methoxyphenyl)-2-hexyne (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexene-3-one (VI). Either the ketamine (V) or the ketone (VI), or mixtures thereof, is then reacted with 2-methyl-1,3-cyclopentanedione (VII) under Michael condensation conditions, e.g., refluxing in methanolic potassium hydroxide to form 2-methyl-2-[6-(m-methoxyphenyl)-3-oxohexyl]-1,3-cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β - methyl - 3-methoxygona-1,3,5(10),8,14-pentaen-17-one (IX). The 8 and 14-unsaturation of Compound IX is then hydrogenated in the presence of a metal catalyst, such as 10% palladized carbon, to form 13β-methyl-3-methoxy-8-isogona-1,3,5-(10)-trien-17-one (X). Reduction of the carbonyl group of compound X to a hydroxymethylene group, as with sodium borohydride in an alcohol, then gives 13β-methyl-3-methoxy-8-isogona-1,3,5(10)-trien-17β-ol XI, which, by alkali metal reduction in liquid ammonia in the presence of a proton donor such as ethanol (Birch reduction), is coverted to 13β-methyl - 3 - methoxy-8-isogon-2,5(10)-dien-17β-ol (XII) which, on Oppenauer oxidation, gives 13β-methyl-3-methoxy-8-isogona-2,5(10)-dien-17-one XIII. Ethynylation at the 17-position of compound XIII with lithium acetylide in dimethylacetamide gives 13β-methyl-17α-ethynyl-3-methoxy-8-isogona-2,5(10)-dien-17β-ol XIV. By acid hydrolysis with a weak acid such as oxalic acid, Compound XIV is converted to Compound IV, 13β-methyl-17α-ethynyl-17β-hydroxy-8-isogon-5(10)-en-3-one.

Figure 4:
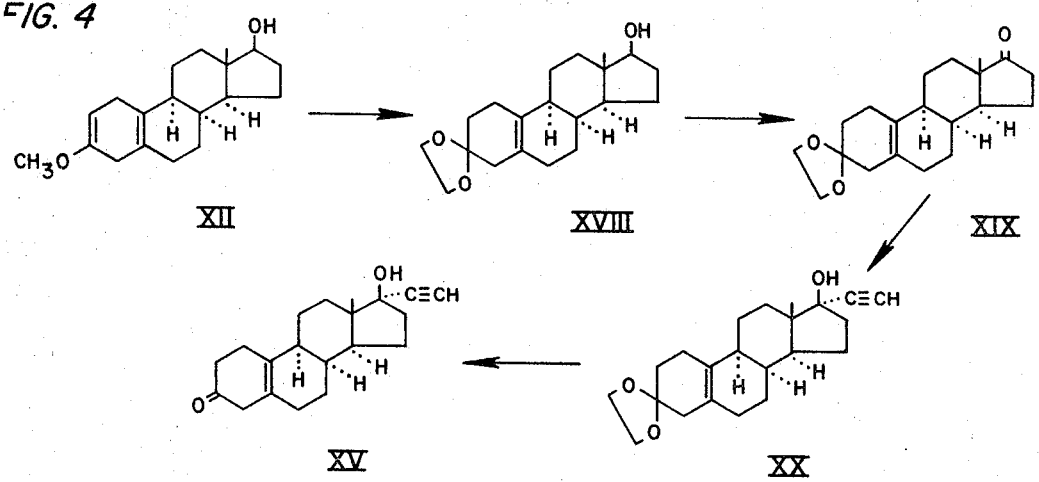
FIG. 4 illustrates schematically the reaction sequence for preparing a 13-methyl-17-alkynyl-17β-hydroxy-8-isogon-5(10)-en-3-one from a 13-methyl-3-alkoxy-8-isogona - 2,5(10) - dien-17-ol, specifically 13β-methyl-17α-ethynyl-17β-hydroxy - 8 - isogona-5(10)-en-3-one from 13β-methyl-3-methoxy-isogona-2,5(10)-dien-17β-ol.

Referring now to FIG. 4, an alternate route for the preparation of the gon-5(10)-ene XV starts from the gona-2,5(10)-diene XII through an initial reaction with ethylene glycol in refluxing benzene in the presence of toluene p-sulfonic acid as catalyst to give the ketal 13β-methyl - 3,3 - ethylenedioxy - 8 - isogon-5(10)-en-17β-ol (XVIII), which on oxidation of the 17-hydroxyl group with chromium trioxide in pyridine, gives 13β-methyl-3,3-ethylenedioxy-8-isogon-5(10)-en-17-one XIX. Ethynylation at the 17-position with lithium acetylide-ethylenediamine complex in dimethylacetamide converts Compound XIX to 13β - methyl - 3,3 - ethylenedioxy-17α-ethynyl-8-isogon-5(10)-en-17β-ol XX, which, by mild acid hydrolysis, affords the 13β-methyl-17α-ethynyl-8-isogon-5(10)-en-17β-ol XV.

Referring now to FIG. 5, the Compound XVI, serves as a starting material for the preparation of the mixture of 8-isogon-5(10)-ene XXIII and the 8-isogon-4-ene XXIV through an initial hydrogenation in benzene in the presence of a palladium catalyst, so as to afford 17α-ethyl - 13β - methyl-3-methoxy-8-isogona-1,3,5(10)-trien-17β-ol XXI, which, on reduction with lithium and an alcohol in liquid ammonia (Birch reduction), gives 17α-ethyl - 13β - methyl - 3-methoxy-8-isogona-2,5(10)-dien-17β-ol (XXII). Hydrolysis of compound XXII with mineral acid gives a mixture of the 17α-ethyl-13β- methyl - 17β - hydroxy-8-isogon-5(10)-en-3-one (XXIII) and 17α-ethyl-13β-methyl-17β-hydroxy-8-isogon-4-isogon-4-en-3-one (XXIV). It is apparent that the hereinbefore described processes offer a unique readily available route to 13-methyl-8-isogonanes, previously available only with difficulty, some of which are the 8-isomers of the corresponding natural steroids, and that these compounds can, by further modification, be converted to other novel valuable therapeutic agents. The ready availability of these isomers allows their transformation, by methods standard in the art, to various derivatives. Thus in any of the structures wherein the 17-position is carbonyl, the carbonyl group can be converted to a group such as hydroxymethylene by lithium aluminum hydride reduction; to acyloxymethylene by esterification of the hydroxymethylene group as formed; to alkoxymethylene by esterification of the hydroxymethylene group so formed; to alkylhydroxymethylene by addition of the appropriate organo-metallic reagent to the carbonyl; or to alkynylhydroxymethylene by addition of the appropriate alkali metal acetylide in a suitable inert solvent. The carbonyl group may also be ketalized or thioketalized by treatment with the appropriate alcohol or glycol in a suitable solvent under acidic conditions, as in the presence of an acid such as sulphuric acid, p-toluenesulphonic acid, or boron trifluoride etherate with heating where necessary. Hydroxyl and phenolic groups, where present, can be converted to corresponding ethers or esters. The esters formed may be derived from organic acids such as acetic acid, or from an inorganic acid such as sulphuric acid or phosphoric acid.

The aromatic ring of the phenylpropanol (FIG. 1, I) used as the starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referring to electrophilic aromatic substitution) such as hydroxy, acyloxy, alkoxy, amino, alkylamino, or acylamino is a necessary substituent on the aromatic ring. The term "para-directing group (referring to electrophilic aromatic substitution)" as used herein means an activating group such as those hereinbefore listed and which activate all positions on the aromatic nucleus. Thus if the group is para-directing, as defined above, it can be in a position meta to the ortho position to which ring closure is limited by steric considerations, said position being activated even though another position is more highly activated. Ring closure could not occur at the said more highly activated position because of the above mentioned steric limitations. The group may be present initially or may be introduced later but before ring closure, either directly, or by conversion from a meta-directing group such as nitro. After the tetracyclic structure has been formed, substituents, which are not limited as above, can be introduced into the aromatic A-ring; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy, alkylenethioxy, and alkylenedithio; or groups introducible by known processes, such as halogen or alkyl.

The carbon atom to which the phenyl group of the starting propanol (I) is attached can be substituted as, for example, with an alkyl group, such as methyl or ethyl. The 2-carbon atom of the starting phenyl-propanol (I) can also be substituted, as, for example, with an alkyl group, such as methyl and ethyl, and, as such, be unchanged throughout the subsequent synthesis. In the tetracyclic structures of the invention this carbon atom will appear at the 7-position.

In the Michael reaction step, the 3-keto substrate compound can be a 6-phenyl-1-hexen-3-one, or alternatively, a 6-phenyl-1-hexan-3-one having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to form the Michael product.

Also, in any of the intermediate or tetracyclic structures, the functional groups already present may be exploited to introduce substituent groups such as hydroxyl, alkyl, and halogen, into ring A and at the 6-, 7-, and 16-positions, or positions corresponding thereto in the gonane nucleus. For example, in any of the tetracyclic structures wherein the 17-position is carbonyl, the ketomethylene system at the 16- and 17-positions can be converted to an acetoxyvinyl system by heating with isopropenyl acetate or acetic anhydride in the presence of a strong acid such as p-toluenesulphonic acid; and thence to a 16,17-dihydroxylated structure by treatment with a peracid such as perbenzoic acid followed by reduction with lithium aluminum hydride.

Representative formulations embodying specific compositions of the invention are as follows:

A capsule for use as an oral pituitary blocking agent contains:

|  | Mg. |
|---|---|
| 17α-ethynyl-13-methyl-8-isogona-1,3,5(10)-trien-3,17-diol | 0.5–10 |
| Magnesium stearate | 24 |
| Lactose, U.S.P. q.s. ad. | 480 |

A tablet for use as an oral pituitary blocking agent contains:

|  | Mg. |
|---|---|
| 17α-ethynyl-13-methyl-8-isogona-1,3,5(10)-trien-3,17-diol | 0.5–10 |
| Magnesium stearate | 0.65 |
| Talc, U.S.P. | 10.00 |
| Avicel (American Viscose Division, F.M.C. Corporation) | 115.00 |
| Lactose, U.S.P. q.s. ad. | 260 |

A pharmaceutical tablet for use as an oral progestational agent consists of the following ingredients:

|  | Mg. |
|---|---|
| 17α-ethynyl-17-hydroxy-13-methyl-8-isogon-5(10)-en-3-one | 1–20 |
| Carboxymethylcellulose (Viscosity 400 cps.) | 15 |
| Lactose powder | 25 |
| Redried corn starch | 25 |
| Magnesium stearate powder | 4 |
| Calcium silicate powder, q.s. | |

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents; it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin, tragacanth, methylcellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it.

Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packaged powders or vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulations including sustained-release agents.

The following preparations illustrate the manner of making the chemical compounds which are the starting materials for use in the processes of the invention.

PREPARATION 1

3-(3-methoxyphenyl)-n-propyl bromide

Cool 3-(3-methoxyphenyl)propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hr. and then heat at 60° for 3 hrs. Cool, pour onto ice, dilute with ether and separate the organic layer. Wash the organic solution with 3 N aqueous sodium hydroxide, water, and dry. Remove the solvent and distill the residue to obtain the title compound (131 g.) B.P. 146–148°/17 mm. $n_D^{18}$ 1.5497.

$C_{10}H_{13}BrO$ calcd. (percent): C, 52.4; H, 5.7; Br, 34.8. Found (percent): C, 54.4; H, 5.7; Br, 34.7.

PREPARATION 2

5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distill to obtain 5-m-methoxyphenylpent-1-yne (7.1 gr., 66%), B.P. 75–78° C./0.06 mm. Hg.

$C_{12}H_{14}O$ calcd. (percent): C, 82.7; H, 8.1. Found (percent): C, 82.2; H, 7.8.

PREPARATION 3

1-diethylamino-6-m-methoxyphenylhex-2-yne

Allow 5-m-methoxyphenylpent-1-yne (8 g.) to stand for 12 hours at 70° C. under nitrogen with water (2.5 cc.), trioxan (0.5 g.), 30% formalin (5.5 g.), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), B.P. 130–131° C./0.1 mm.

$C_{17}H_{25}N$ calcd. (percent): C, 78.7; H, 9.7. Found (percent): C, 78.9; H, 9.6.

PREPARATION 4

1-diethylamino-6-m-methoxyphenylhexan-3-one and 6-m-methoxyphenylhex-1-en-3-one

Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent ot obtain the crude ketoamine 1-diethylamino-6-m-methoxyphenylhexan-3-one, infrared absorption peak at 1710μ. Distill under reduced pressure with partial elimination of diethylamine, to obtain a mixture of the ketoamine 1-diethylamino-6-m-methoxyphenylhexan-3-one and the vinyl ketone 6-m-methoxyphenylhex-1-en-3-one (7.1 g., ca. 76%), B.P. 140–145° C./0.1 mm.; infrared absorption peaks at 5.85 and 5.95μ, the ketoamine predominating.

Distill a second portion of the crude ketoamine 1-diethylamino-6-m-methoxyphenylhexan-3-one very slowly over a period of 30 minutes through a Vigroux fractionating column 10 cm. high and 1 in. diameter under reduced pressure to eliminate most of the diethylamine. Dissolve the 6-m-methoxyphenylhex-1-en-3-one obtained (B.P. 114° C./0.7 mm.) in ether and wash the ether solution with dilute hydrochloric acid, followed by aqueous sodium bicarbonate and water. Dry and evaporate. Distill the residue to give the pure vinyl ketone as a colorless liquid, B.P. 76° C./0.3 mm.

$C_{13}H_{16}O_2$ calcd. (percent): C, 76.4; H, 7.9. Found (percent): C, 76.3; H, 8.0.

Mix a third portion of the crude undistilled 1-diethylamino-6-m-methoxyphenylhexan-3-one (3 g.) with methyl iodide (3 g.). An exothermic reaction soon develops. After 12 hours wash the mixture with ether to remove unchanged reactants and subject to reduced pressure (15 min.) to remove ether remaining: the residue is the crude methiodide of the ketoamine (4.6 g.).

Infrared absorption peaks at 5.85μ.

This compound is useful for preparing the novel compositions of this invention which have hormonal activity.

PREPARATION 5

2-(6-m-methoxyphenyl-3-oxohexyl)-2-methylcyclopentane-1,3-dione

Reflux 6-m-methoxyphenylhex-1-en-3-one, containing a small amount of 1-diethylamino-6-m-methoxyphenylhexan-3-one (6 g., the material produced by the slow distillation of the latter substance), with 2-methylcyclopentane-1,3-dione (3.5 g.) in 0.12% anhydrous methanol in potassium hydroxide (10 cc.) for 10 hours. Work up the reaction mixture as described for the preparation of the compound as titled above, to obtain the crude triketone 2-(6-m-methoxyphenyl-3-oxohexyl) - 2 - methylcyclopentane-1,3-dione (8 g.). Distill a small portion of this at 0.02 mm. for analysis.

$C_{19}H_{24}O_4$ calcd. (percent): C, 72.1; H, 7.65. Found (percent): C, 72.3; H, 7.45.

This compound is useful as an intermediate for preparing the novel compositions of this invention having hormonal activity.

PREPARATION 6

13β-methyl-3-methoxygona-1,3,5(10),8,14-pentaen-17-one

Dissolve the triketone 2-(6-m-methoxyphenyl-3-oxohexyl)-2-methylcyclopentane-1,3-dione (6.7 g.), in dry benzene (100 cc.) containing anhydrous toluene-p-sulphonic acid (2.4 g.). Reflux the mixture using a Dean-Stark water separator until the equivalent of two molecular proportions of water (0.99 cc.) is collected (30 min.), indicating a double cyclodehydration. Cool and wash to remove acid, and dry. Evaporate the dried solution to obtain a red gum. Distill the gum under reduced pressure (bath temp. 210°, 0.5 mm.). Recrystallize the solidified distillate from methanol, giving 13β-methyl-3-methoxygona-1,3,5(10),8,14-pentaen-17-one (3.9 g.), M.P. 115–6°; ultraviolet absorption peak at 313 mμ (ε 35,100). The light absorption is in agreement with the structure assigned.

The following examples illustrate the manner of using the claimed processes of the invention for the preparation of the claimed compositions of the invention, and for the preparation of natural steroids.

EXAMPLE 1

13β-methyl-3-methoxy-8-isogona-1,3,5(10)-trien-17-one

Hydrogenate 13β-methyl-3-methoxy-gona-1,2,5(10),8,14-pentaen-17-one (3 g.) dissolved in ethanol (150 cc.) at atmospheric pressure in the presence of a 4% palladium on barium sulphate catalyst (3 g.) until hydrogen uptake ceases. Filter the catalyst and evaporate the filtrate to obtain residue and crystallize from ethanol to obtain the title compound (1.1 g.).

This compound has estrogenic activity, lowers the lipid level, and is useful as an intermediate for preparing the hormonal compounds of this invention.

EXAMPLE 2

13β-methyl-3-methoxy-8-isogona-1,3,5(10)-trien-17-one

Dissolve 13β - methyl-3-methoxy-gona-1,3,5(10),8,14-pentaen-17-one (1 g.) in benzene (35 cc.) and shake with hydrogen at atmospheric pressure in the presence of a 10% palladium on charcoal catalyst (0.5 g.) until hydrogen uptake ceases. Remove the catalyst, evaporate the solvent and recrystallize the residue from ethanol to obtain the title compound (0.55 g., 54%), M.P. 151–153°.

To obtain 13β,6-dimethyl - 3 - methoxy-8-isogona-1,3,5(10)-trien-17-one, hydrogenate 13β,6-dimethyl-3-methoxygona1,3,5(10),8,14-pentaen-17-one according to the manipulative procedure described above.

To obtain 13β,7 - dimethyl - 3 - methoxy - 8 - isogona-1,3,5(10)-trien-17-one, hydrogenate 13β,7 - dimethyl-3-methoxygona - 1,3,5(10),8,14-pentaen - 17 - one according to the manipulative procedures described above.

These compounds have estrogenic activity, lower the lipid level, and are useful as intermediates for preparing the hormonal compounds of this invention.

EXAMPLE 3

13β-methyl-3-methoxy-8-isogona-1,3,5(10)-trien-17-one

Hydrogenate 13β - methyl - 3 - methoxygona - 1,3,5(10),8-tetraen-17-one (2 g.) in ethanol (100 cc.) at atmospheric pressure in the presence of a 10% palladium on charcoal catalyst (1.5 g.) until hydrogen uptake ceases. Filter the catalyst and evaporate the filtrate and recrystallize the residue from ethyl acetate to obtain the title compound, M.P. 121–124°.

To obtain 13β - methyl - 3 - methoxy - 8 - isogona-1,3,5(10)-trien-17β - ol, hydrogenate 13β - methyl - 3-methoxygona-1,3,5(10),8-tetraen-17β-ol according to the manipulative procedure described above.

To obtain 13β - methyl - 3 - methoxy - 8 - isogona-1,3,5(10)-trien-17β-ol, acetate hydrogenate 13β - methyl-3-methoxygona-1,3,5(10),8-tetraen-17β-ol, acetate according to the manipulative procedure described above.

These compounds have estrogenic activity, lower the blood lipid level and are useful as intermediates for preparing the hormonal compounds of this invention.

EXAMPLE 4

13β-methyl-3-hydroxy-8-isogona-1,3,5(10)-trien-17-one

Hydrogenate 13β - methyl - 3 - hydroxygona - 1,3,5 (10),8,14-pentaen-17-one (0.16 g.) in ethanol (20 cc.) at atmospheric pressure in the presence of a 30% palladized charcoal catalyst (0.075 g.). When 2.2 molar equivalents of hydrogen have been absorbed, (4 hours), filter the catalyst and evaporate the filtrate. Recrystallize the residue from methanol to obtain the title compound as colorless plates, M.P. 246–9° with sublimation; ultraviolet absorption peak at 281 mμ (ε 2,150).

This compound has estrogenic activity, lowers the blood lipid level, and is useful as an intermediate for preparing the hormonal compounds of this invention.

EXAMPLE 5

13β-methyl-3-hydroxy-8-isogona-1,3,5(10)-trien-17-one

Hydrogenate 13β - methyl - 3 - acetoxygona - 1,3,5 (10),8,14-pentaen-17-one (0.38 g., obtained by the acetylation of bisdehydroestrone with pyridine and acetic anhydride) in ethanol (20 cc.) at atmospheric pressure with a 10% palladium on charcoal catalyst (0.02 g.) until hydrogenation ceases. Filter the catalyst and evaporate the solvent to obtain colorless crystals of 13β - methyl-3-acetoxy-8-isogona-1,3,5(10) - trien-17-one. Take up the product in methanol (3 cc.), and add 3 N sodium hydroxide solution (1 cc.). After 15 minutes, acidify the solution and filter the precipitate obtained, and recrystallize from methanol to obtain the title compound, M.P. 253–5° with previous sublimation and softening at 247°; ultraviolet absorption peak at 281 mμ (ε 2,200).

This compound has estrogenic activity, lowers the blood lipid level, and is useful as an intermediate for preparing the hormonal compounds of this invention.

EXAMPLE 6

13β-methyl-3-hydroxy-8-isogona-1,3,5(10)-trien-17-one

Hydrogenate 13β - methyl - 3 - hydroxygona - 1,3,5 (10),8,14-pentaen-17-one (0.14 g.) in a mixture of benzene (37.5 cc.) and tetrahydrofuran (12.5 cc.) at atmospheric pressure using a 10% palladium on charcoal catalyst (0.075 g.) until hydrogen uptake is complete (6 hours). Remove the catalyst and the solvent to obtain a residue and crystallize from methanol to obtain the title compound, M.P. 246–7.5°; ultraviolet absorption peak at 281 mμ (ε 1,900), confirming complete hydrogenation of the ethylenic bonds.

This compound has estrogenic activity, lowers the blood lipid level, and is useful as an intermediate for preparing the hormonal compounds of this invention.

EXAMPLE 7

13β-methyl-3-methoxy-8-isogona-1,3,5(10)-trien-17β-ol

Shake 13β - methyl - 3 - methoxygona - 1,3,5(10),8,14-pentaen-17β-ol (2.3 g.) in ethanol (100 cc.) with hydrogen at atmospheric pressure in the presence of a 10% palladium on charcoal catalyst (1.2 g.). Remove the catalyst and solvent and crystallize the residue from methanol and then from a mixture of benzene and light petroleum to obtain the title compound, M.P. 103–104° C. on admixture with authentic material obtained by another route, M.P. 101–102° C.

This compound has estrogenic and blood lipid lowering activity and is useful as an intermediate for preparing the hormonal compounds of this invention.

EXAMPLE 8

13β-methyl-3,17β-dimethyl-8-isogona-1,3,5(10)-triene

Add 13β - methyl - 3 - methoxy - 8 - isogona - 1,3,5 (10)-trien-17β-ol (75 g.) in methylene chloride (50 cc.) containing 1 drop of boron trifluoride etherate to diazomethane (from N-nitrosomethylurea, 2.05 g.) in methylene chloride (40 cc.). Work up and recrystallize the product from ethyl acetate-hexane and then from methanol to obtain the title compound (3 g.), M.P. 106–108°.

$C_{20}H_{28}O_2$ calcd. (percent): C, 80.0; H, 9.4. Found (percent): C, 79.8; H, 9.3.

This compound has estrogenic and blood lipid lowering activity and is useful as an intermediate for preparing the hormonal compounds of this invention.

EXAMPLE 9

13β-methyl-3-methoxy-17,17-propylenedioxy-8-isogona-1,3,5(10)-triene

Shake 13β - methyl - 3 - methoxy - 17,17 - propylenedioxygona-1,3,5,(10),8,14-pentaene (1 g.) in ethanol (45 cc.) with 10% palladized charcoal (0.4 g.) in an atmosphere of hydrogen until uptake ceases (ca. 25 cc.). Remove solvent by filtration, evaporate the solvent under reduced pressure, and crystallize the residue from methanol to obtain the title compound; ultraviolet absorption peaks at 278, 286 mμ (ε 3,000:1,800).

This compound has estrogenic and blood lipid lowering activity, and is useful as an intermediate for preparing the hormonal compounds of this invention.

EXAMPLE 10

2,3-dimethoxy-13β-methyl-8-isogona-1,3,5(10)-trien-17-one

Dissolve 2,3-dimethoxy - 13β - methylgona - 1,3,5(10), 8,14-pentaen-17-one (2.0 g.) in ethanol (250 ml.) and add to 10% palladized charcoal (400 mg.) in ethanol (ca. 10 ml.). Shake the mixture until uptake of hydrogen ceases, when 75% of the theoretical amount will be absorbed. Filter off the catalyst. Recrystallize the residue from methanol to obtain the title compound (1.1 g.), M.P. 162–168°; ultraviolet absorption peaks (ethanol) at 282 mμ and 287 mμ (ε 4,000); infrared maximum at 5.75μ. Recrystallize from acetone to obtain an analytical sample with M.P. 171–173°. (Found (percent): C, 76.44; H, 8.29; $C_{20}H_{26}O_3$ requires (percent): C, 76.40; H, 8.34.)

This compound has estrogenic activity, lowers the blood lipid level, and is useful as an intermediate for preparing the hormonal compounds of this invention.

EXAMPLE 11

3-methoxy-13β-methyl-8-isogona-1,3,5(10),16-tetraene-17-ol, acetate

Reflux 3-methoxy - 13β - methyl-8-isogona-1,3,5(10)-trien-17-one (2 g.) with isopropenyl acetate (30 ml.) containing toluene-p-sulfonic acid monohydrate (0.332 g.) for 14 hr. with slow distillation of the solvent (20 ml.). Add ether (40 ml.) to the cooled solution and wash with 5% aqueous sodium bicarbonate, water, and brine. Remove the solvent under reduced pressure and dissolve the residue in hexane (100 ml.) and chromatograph on Florex (60 g.). Elute with benzene and obtain a yellow gum (1.5 g.) which crystallizes. Recrystallize from petroleum ether to obtain the title product (0.6 g.), M.P. 84–85°.

This compound has estrogenic activity, lowers the blood lipid level, and is useful as an intermediate for preparing the hormonal compounds of this invention.

EXAMPLE 12

17β-allyloxy-3-methoxy-13β-methyl-8-isogona-1,3,5(10)-triene

Suspend 3-methoxy - 13β - methyl-8-isogona-1,3,5(10)-trien-17β-ol (3.8 g.) in sodium hydride (3.0 g. of 50% in oil) and xylene (300 ml.). Reflux for 1 hour, add allyl bromide (13.8 ml.) over a period of 1.5 hours, and reflux the reaction mixture an additional 5 hours. Add water and extract the organic layer with 2 N hydrochloric acid. Evaporate the solvent. Dissolve the residue in petroleum ether and chromatograph over neutral alumina. Elute with ether and crystallize from methanol to obtain the title compound, M.P. 96–97°. (Found (percent): C, 80.87; H, 9.27; $C_{22}H_{30}O_2$ requires (percent): C, 80.93; H, 9.26.)

This compound has estrogenic activity, lowers the blood lipid level, and is useful as an intermediate for preparing the hormonal compounds of this invention.

EXAMPLE 13

3-methoxy-13β-methyl-17β-propoxy-8-isogona-1,3,5(10)-triene

Suspend 17β-allyloxy-3-methoxy - 13β - methyl-8-isogona-1,3,5(10)-triene (1.0 g.) in alcohol (30 ml.) and hydrogenate at 1 atmosphere in the presence of 10% palladized charcoal (300 mg.) until hydrogen uptake ceases. Filter off the catalyst and evaporate the solvent. Crystallize the residue from methanol to obtain the title compound, M.P. 96–98°. (Found (percent): C, 80.68; H, 9.83; $C_{22}H_{32}O_2$ requires (percent): C, 80.44; H, 9.83.)

This compound has estrogenic activity, lowers the blood lipid level, and is useful as an intermediate for preparing the hormonal compounds of this invention.

EXAMPLE 14

17α-ethynyl-13β-methyl-8-isogona-1,3,5(10)-trien-3,17-diol

Dissolve 3 - hydroxy - 13β - methyl - 8 - isogona - 1,3,5 (10)-triene-17-one (0.8 g.) in tetrahydrofuran (15 ml.) and add to a solution prepared by passing excess acetylene through a suspension of lithium aluminum hydride (1.0 g.) in tetrahydrofuran (30 ml.).

Stir the mixture overnight, decompose with water, and filter. Dry and evaporate the filtrate. Recrystallize the residue from methanol to obtain the title compound (0.45 g.), M.P. 226–228°. (Found (percent): C, 81.17; H, 8.27. $C_{20}H_{24}O_2$ requires (percent): C, 81.04; H, 8.16.)

This compound has estrogenic activity and is useful as an intermediate for preparing the hormonal compounds of this invention.

EXAMPLE 15

17α-ethynyl-3-methoxy-13β-methyl-8-isogona-1,3,5(10)-trien-17-ol

Add 3-methoxy - 13β - methyl - 8 - isogona-1,3,5(10)-trien-17-one (0.5 g.) in toluene (15 ml.) to a solution of potassium (0.6 g.) in tert-amyl alcohol (15 ml.) and pass acetylene through the solution for 48 hours. Add water and isolate the product with ether. Chromatograph on alumina (20 g.). Elute unchanged starting material with benzene and the title compound with benzene ether (3:2) 292 mg., M.P. 135–137°.

This compound has estrogenic activity and is useful as an intermediate for preparing the hormonal compounds of this invention.

EXAMPLE 16

17α-ethyl-3-methoxy-13β-methyl-8-isogona-1,3,5(10)-trien-17-ol

Hydrogenate 17α - ethynyl - 3-methoxy-13β-methyl-isogona-1,3,5(10)-trien-17-ol (0.292 g.) in dioxane (10 ml.) with a 5% palladized charcoal catalyst until uptake of hydrogen ceases (49 ml. absorbed). Filter the catalyst and evaporate the filtrate to give the title compound (0.28 g.).

This compound has estrogenic activity and is useful as an intermediate for preparing the hormonal compounds of this invention.

EXAMPLE 17

17α-ethyl-3-methoxy-13β-methyl-8-isogona-2,5(10)-dien-17-ol

Dissolve 17α - ethyl - 3 - methoxy-13β-methyl-8-isogona - 1,3,5(10) - trien-17-ol (0.28 g.) in tetrahydrofuran (6 ml.), ether (14 ml.), and liquid ammonia (60 ml.). Stir and add lithium (0.3 g.) Treat with ethanol (4 ml.) over a 10-minute period to discharge the blue color. Add water and extract the mixture with ether. Wash, dry, and evaporate the ethereal solution to obtain the title compound (0.24 g.); infrared maxima at 2.85, 5.9, 6.0μ.

This compound is useful as an intermediate for preparing the novel compositions of this invention which have hormonal activity.

EXAMPLE 18

3-methoxy-13β-methyl-8-isogona-2,5(10)-dien-17β-ol

Dissolve 3-methoxy-13β-methyl - 8 - isogona-1,3,5(10)-trien-17β-ol (28 g.) in liquid ammonia (1 l.)-tetrahydrofuran (300 ml.) and reduce with lithium (18 g.) and ethanol. Recrystallize the product from ether to obtain the title compound (18 g.), M.P. 143–147°, $\nu_{max}$. 3472, 1695 and 1669 cm.$^{-1}$. (Found (percent): C, 79.0; H, 9.4. $C_{19}H_{28}O_2$ requires (percent): C, 79.1; H, 9.8.) Concentrate the mother liquors to obtain further product (3.0 g.), M.P. 140–143°.

This compound is useful as an intermediate for preparing the novel compositions of this invention which have hormonal activity.

EXAMPLE 19

3-methoxy-13β-methyl-8-isogona-2,5(10)-dien-17-one

Dissolve 3-methoxy-13β-methyl-8-isogona-2,5(10)-dien-17β-ol (20 g.) in toluene (1.3 l.)-cyclohexanone (283 ml.) containing aluminum isopropoxide (16.7 g.). Reflux for 3 hours under nitrogen. Recrystallize the product from aqueous methanol to obtain the title compound, M.P. 106–111° (after softening at 94–96°),$\nu_{max}$. 1724, 1695 and 1667 cm.$^{-1}$.

This compound is useful as an intermediate for preparing the novel compositions of this invention which have hormonal activity.

EXAMPLE 20

17α-ethynyl-3-methoxy-13β-methyl-8-isogona-2,5(10)-dien-17β-ol

Saturate dimethylacetamide (1 l.) with acetylene. While slowly bubbling acetylene through the saturated solution, add 3-methoxy-13β-methyl-8-isogona-2,5(10)-dien-17-one (10 g.) and lithium acetylide-ethylenediamine complex (13.9 g.) and stir for 2 hours at room temperature. Add the mixture to crushed ice-ammonium chloride and extract with ether. Recrystallize the product from methanol to obtain the title compound (8 g.), M.P. 174–182°, $\nu_{max}$. 3401, 3205, 1695 and 1667 cm.$^{-1}$.

This compound is useful as an intermediate for preparing the novel compositions of this invention which have hormonal activity.

EXAMPLE 21

17β-hydroxy-13β-methyl-8-isogon-5(10)-en-3-one, cyclic ethylene acetal

Add 3.6 g. 3-methoxy-13β-methyl-8-isogona-2,5(10)-dien-17β-ol in 40 ml. benzene to a mixture of 0.36 g. p-toluenesulfonic acid and 7.2 ml. ethylene glycol in 70 ml. benzene, and reflux for 20 hours, using a Dean-Stark trap. Cool, wash with saturated sodium bicarbonate solution, water, and brine, and dry over sodium sulfate. Evaporate to obtain 3.6 g. of title compound, M.P. 118–123°. I.R. 3.05, 9.1, 9.45μ.

This compound has estrogenic activity and is useful as an intermediate for preparing the hormonal compounds of this invention.

EXAMPLE 22

13β-methyl-8-isogon-5(10)-ene-3,17-dione, cyclic 3-ethylene acetal

Dissolve 0.69 g. 17β-hydroxy-13β-methyl-8-isogon-5(10)-en-3-one, cyclic ethylene acetal, in 10 ml. pyridine and add 0.6 g. chromium trioxide with cooling. After letting stand for 20 hours at room temperature, add 10 ml. ethyl acetate and filter through a short column of alumina (10 g.). Evaporate and crystallize from ethanol to obtain 0.56 g. of title compound, M.P. 139–148°. I.R. 5.57, 9.0μ.

This compound has estrogenic activity and is useful as an intermediate for preparing the hormonal compounds of this invention.

EXAMPLE 23

17α-ethynyl-17-hydroxy-13β-methyl-8-isogon-5(10)-en-3-one, cyclic ethylene acetal Add 0.56 g. 13β-methyl-8-isogon-5(10)-ene-3,17-dione, cyclic 3-ethylene acetal, in 20 ml. toluene to a stirred solution of 0.56 g. potassium in 20 ml. t-amyl alcohol in an atmosphere of nitrogen. Pass a purified stream of acetylene through the mixture for 20 hours. Add water, extract with ether, wash with water, and dry. After evaporation, dissolve in 5 ml. benzene and absorb on 50 g. alumina. Elute with 60–80° light petroleum containing increasing amount of benzene. Petroleum-benzene (1:9) and benzene elute unchanged ketone (0.16 g.). Benzene-ether (6:4) elutes 0.26 g. of title compound, M.P. 168–170°, after recrystallization from light petroleum. I.R. 2.93, 3.1, 9.5μ.

This compound has progestational activity and is useful as an intermediate for preparing the hormonal compounds of this invention.

EXAMPLE 24

17α-ethynyl-13β-methyl-8-isogon-5-ene-3,17β-diol

Reduce 0.85 g. 17α-ethynyl-17β-hydroxy-13β-methyl-8-isogon-5(10)-en-3-one with 0.3 g. sodium borohydride in 50 ml. methanol. Recrystallize from ether to obtain 0.5 g., of title compound, M.P. 193–203°.

Calc'd for $C_{20}H_{28}O_2$ (percent): C, 79.95; H, 9.33. Found (percent): C, 79.05; H, 9.33.

This compound has progestational activity and is useful as an intermediate for preparing the hormonal compounds of this invention.

EXAMPLE 25

17α-ethyl-17-hydroxy-13β-methyl-8-isogon-4-en-3-one

Treat a solution of 17α-ethyl-13β-methyl-3-methoxy-8-isogona-2,5(10)-dien-17-ol (0.24 g.) in methanol (10 ml.) with hydrochloric acid (0.6 ml.) and water (0.5 ml.). Allow the mixture to stand for 2 hours. Add water and remove most of the methanol under reduced pressure. Extract the mixture with ether and wash, dry, and evaporate the ethereal solution to give a solid (0.18 g.). Chromatograph on neutral alumina benzene-ether (19:1) and benzene-ether (7:3). Elute a series of fractions. Combine the fractions and crystallize from methanol to obtain a mixture of 17α-ethyl-17-hydroxy-13β-methyl-8-isogon-5(10)-en-3-one and the title compound (about 25%), M.P. 139–164°; infrared maxima at 2.9, 6.05, 5.9μ.

This compound has anabolic and androgenic activity and is useful as an intermediate for preparing the hormonal compounds of this invention.

EXAMPLE 26

17β-hydroxy-13β-methyl-8-isogon-4 [and 5(10)]-en-3-one

Stir 3-methoxy-13β-methyl-8-isogona-2,5(10)-dien-17β-ol (0.35 g.) with methanol (20 ml.) and 6 N hydrochloric acid (10 ml.) for 30 minutes. Add water and extract the mixture with ether. Wash, dry, and evaporate the ethereal solution. Recrystallize the residue from ethyl acetate-hexane to obtain a mixture of 17β-hydroxy-13β-methyl-8-isogon-4 [and 5(10)]-en-3-one (0.182 g.), M.P. 110–158°, $\nu_{max}$. 3350, 1700 and 1655 cm.$^{-1}$.

This compound has anabolic and androgenic activity and is useful as an intermediate for preparing the hormonal compounds of this invention.

EXAMPLE 27

17α-ethynyl-17β-hydroxy-13β-methyl-8-isogon-4 [and 5(10)]-en-3-one

Dissolve 17α - ethynyl-17-hydroxy-13β-methyl-8-isogon-5(10)-en-3-one (0.3 g.) in methanol (36 ml.)-concentrated hydrochloric acid (2.4 ml.)-water (1.6 ml.). Stir under nitrogen for 3 hours to obtain a total crude crystalline product with infrared absorption bands of comparable intensities at 1704 and 1653 cm.$^{-1}$. Recrystallize from ethyl acetate to obtain crystals of 17α-ethynyl-17-hydroxy-13β-methyl-8-isogon-4-en-3-one (0.15 g.), M.P. 180–192°, $\nu_{max}$. 3367, 3215, 2083, 1701, and 1650 cm.$^{-1}$, the penultimate band. (Found (percent): C, 80.4; H, 8.8.)

This compound has progestational activity and is useful as an intermediate for preparing the hormonal compounds of this invention.

EXAMPLE 28

17β-hydroxy-13β-methyl-8-isogon-5(10)-en-3-one

Stir 3 - methoxy-13β-methyl-8-isogona-2,5(10)-dien-17β-ol (1 g.) for one hour in methanol (60 ml.)-water (14 ml.) containing oxalic acid (from the dihydrate, 1.2 g.). Add saturated aqueous sodium hydrogen carbonate and extract the mixture with ether.

Recrystallize the product from ethyl acetate to obtain the title compound (0.72 g.), M.P. 170–172°, $\nu_{max}$. 3350 and 1170 cm.$^{-1}$. (Found (percent): C, 78.8; H, 9.95 $C_{18}H_{26}O_2$ requires (percent): C, 78.8; H, 9.55.)

This compound is useful as an intermediate for preparing the novel compositions of this invention which have hormonal activity.

EXAMPLE 29

17α-ethynyl-17β-hydroxy-13β-methyl-8-isogon-5(10)-en-3-one

Dissolve 17α - ethynyl-17-hydroxy-13β-methyl-8-isogon-5(10)-en-3-one, cyclic ethylene acetal in t-amyl alcohol (10 ml.)-toluene (10 ml.)-5 N hydrochloric acid (40 ml.) and reflux for 10 minutes. Evaporate the organic solvents, add water, and extract the mixture with ether-ethyl acetate. Chromatograph the product on neutral alumina to obtain the title compound (0.39 g.), M.P. 185–190°, $\nu_{max}$. 3378, 3215, 2083, 1704, and 1642 (weak) cm.$^{-1}$.

This compound has progestational activity and is useful as an intermediate for preparing the hormonal compounds of this invention.

EXAMPLE 30

17α-ethynyl-17β-hydroxy-13β-methyl-8-isogon-5(10)-en-3-one

Dissolve 17α-ethynyl-3-methoxy-13β-methyl-8-isogona-2,5(10)-dien-17-ol (8 g.) in methanol (500 ml.)-water (90 ml.) containing oxalic acid from the dihydrate, (10.3 g.). Stir for 2 hours. Recrystallize the product from ethyl acetate to obtain the title compound (5.045 g.), M.P. 185–191°, $\nu_{max}$. 3367, 2088, and 1701 cm.$^{-1}$, homogeneous by thin-layer chromatography. (Found (percent): C, 80.0; H, 8.6. $C_{20}H_{26}O_2$ requires (percent): C, 80.5; H, 8.8.)

This compound has progestational activity and is useful as an intermediate for preparing the hormonal compounds of this invention.

EXAMPLE 31

3ξ,17-dihydroxy-17-ethynyl-13β-methyl-8-isogon-5(10)-en, 3-acetate

Dissolve 17α - ethynyl-17-hydroxy-13β-methyl-8-isogon-5(10)-en-3-one (500 mg.) in methanol (50 ml.) and reduce with sodium borohydride (200 mg.). Pour into brine, extract with ether, dry over sodium sulfate, and remove solvents. Dissolve the crystalline product in pyridine (5 ml.) and add acetic anhydride (5 ml.). Stir at room temperature for 20 hours. Add water and extract into ether. Wash the organic layer successively with water, 10% hydrochloric acid, water, saturated sodium bicarbonate solution, and water. Dry the organic solution and remove the solvent. Crystallize the remaining gum from ether-hexane to obtain the title compound (110 mg.), M.P. 165–174°; ultraviolet spectrum showing no selective absorption; infrared maxima (potassium bromide) at 2.90, 3.11, 5.80, 7.93, 9.03, 9.23μ; infrared maxima (carbon disulfide) at 2.81, 3.06, 5.75, 7.85, 8.04, 9.57μ. (Found (percent): C, 77.09; H, 8.62. $C_{22}H_{30}O_3$ requires (percent): C, 77.15; H, 8.83.) Evaporate the ether-hexane mother liquors to obtain a fraction of title compound with M.P. 117–127° (no depression of M.P. of major fraction); infrared maxima (potassium bromide) at 3.06, 3.11, 3.80, 7.93, 8.05, 9.04, 9.75μ; infrared maxima (carbon disulfide) at 2.81, 3.06, 5.76, 7.85, 8.05, 9.58μ.

This compound has progestational activity and is useful as an intermediate for preparing the hormonal compounds of this invention.

EXAMPLE 32

3-methoxy-13β-methylgona-1,3,5(10),8,14,16-hexaen-17-ol, acetate

Reflux 3 - methoxy - 13β - methylgona - 1,3,5(10),8,14-pentaen-17-one (0.5 g.) with toluene-p-sulphonic acid (0.1 g.) in isopropenyl acetate (9 cc.) for 15 hours. Distill 5 cc. of solvent over 1 hour and then cool the solution, dilute with ether and wash the solution with aqueous sodium hydrogen carbonate, water and dry. Evaporate the solvent and recrystallize the residue from ethanol to give the title compound, M.P. 133–135° (0.27 g.); ultraviolet absorption maximum at 357 mμ (25,600).

This compound is useful as an intermediate for preparing the novel compositions of this invention which have hormonal activity.

EXAMPLE 33

3-methoxy-13β-methylgona-1,3,5(10),8,14,16-hexaen-17-ol, acetate

Reflux 13-methyl-3-methoxy-8,14-secogona-1,3,5(10),9-tetraene-14,17-dione (1.5 g.) with isopropenyl acetate (25 cc.) and toluene-p-sulphonic acid (0.25 g.) for 4 hours with distillation of ca. 10 cc. of the solvent. Cool, dilute with ether and wash and dry the organic solution. Filter the residue through a short column of Florisil with petrol-benzene and recrystallize the product from ethanol to give the title product, M.P. 133–135°; ultraviolet absorption maximum at 357 mμ (ε 26,000).

This compound is useful as an intermediate for preparing the novel compositions of this invention which have hormonal activity.

EXAMPLE 34

3-methoxy-13β-methyl-8-isogona-1,3,5(10)-trien-17β-ol, acetate

Hydrogenate 3-methoxy-13β-methylgona-1,3,5(10),8,14,16-hexaen-17-ol, acetate (1 g.) in tetrahydrofuran (20 cc.) and ethanol (30 cc.) at atmospheric pressure in the presence of 10% palladized charcoal until uptake of hydrogen ceases. Filter the catalyst, evaporate the solvent and recrystallize the product from methanol to obtain the title compound.

This compound has estrogenic activity and is useful as an intermediate for preparing the hormonal compounds of this invention.

EXAMPLE 35

17-ethoxy-13β-methyl - 3-methoxygona - 1,3,5(10),8,14,16-hexaene

Dissolve 13β-methyl - 3-methoxygona - 1,3,5(10),8,14-pentaen-17-one (1 g.) in ethanol (4 cc.) and ethyl orthoformate (1 cc.), add concentrated sulphuric acid (1 drop) and keep the mixture at 45° for ½ hour. Add ethyl orthoformate (0.5 cc.) and keep the mixture at 55° for a further ½ hour. Pour the cooled mixture into saturated aqueous sodium hydrogen carbonate and isolate the product with ether. Filter the product through a column of Florisil with hexane containing 10% benzene and recrystallize the product from ethanol to obtain the title compound (0.42 g.), M.P. 79–81°; ultraviolet absorption maxima at 353 mμ (ε 25,000).

This compound is useful as an intermediate for preparing the novel compositions of this invention which have hormonal activity.

EXAMPLE 36

17-ethoxy - 13β-methyl - 3-methoxy-8-isogona-1,3,5(10)-triene

Hydrogenate 17-ethoxy - 13β-methyl-3 - methoxygona-1,3,5,(10),8,14,16-hexaene (1 g.) in tetrahydrofuran (15 cc.) and ethanol (15 cc.) in the presence of 10% palladized charcoal (0.8 g.) until the uptake of hydrogen ceases. Filter the catalyst and evaporate the solvent to obtain the title compound.

This compound has estrogenic activity, lowers the blood lipid level, and is useful for preparing the novel compositions of this invention.

EXAMPLE 37

3-hydroxy-13β - methyl-8 - isogona-1,3,5,(10) - trien-17-one, potassium sulfate

Add sulphamic acid (3.3 g.) to a solution of 3-hydroxy-13β-methyl-8-isogona-1,3,5(10)-trien-17-one (3 g.) in pyridine (15 cc.) and stir the mixture at 80° for 2 hours. Pour the cooled mixture into dry ether and filter the precipitated pyridinium salt, wash it and dry over phosphorus pentoxide. Add the salt to a stirred mixture of pyridine (25.5 cc.) and 12% aqueous potassium hydroxide (45 cc.). Separate the organic layer and evaporate to dryness in vacuo. Wash the residue by decantation with ether and dissolve in methanol with gentle warming. Stir the solution with charcoal for 20 minutes, filter and evaporate the filtrate to obtain the title compound (3.2 g.), M.P. 225–230°.

EXAMPLE 38

2,3-dimethoxy - 13β-methyl - 8-isogona-1,3,5(10) - trien-17β-ol

Slurry 2,3-dimethoxy - 13β-methyl-8 - isogona-1,3,5(10)-trien-17-one (500 mg.) in methanol (75 ml.) and treat with $NaBH_4$ (1.0 g.). Crystallize the product from methylcyclohexane to give the title compound (250 mg.), M.P. 121–123°.

Infrared absorption: 2.93, 6.21, 6.60μ

Found (percent): C, 76.03; H, 8.83. $C_{20}H_{28}O_3$ requires (percent): C, 75.91; H, 8.92.

This compound has estrogenic activity and is useful as an intermediate for preparing the hormonal compounds of this invention.

EXAMPLE 39

3-acetoxy - 13-methyl-8 - isogona-1,3,5(10) - trien-17-one

Heat 3-hydroxy - 13-methyl-8-isogona-1,3,5(10)-trien-17 - one (7.2 g.) with acetic anhydride (24 cc.) in pyridine (40 cc.) at 100° for 90 minutes. Remove the solvents in vacuo and recrystallize the residue from ethanol to obtain the title compound (7.4 g.), M.P. 138–140°.

This compound has estrogenic activity and is useful as an intermediate for preparing the hormonal compounds of this invention.

EXAMPLE 40

17-acetoxy - 2,3-dimethoxy-13 - methyl-8 - isogona-1,3,5(10),16-tetraene

Heat 2,3-dimethoxy - 13-methyl-8 - isogona-1,3,5(10)-trien-17-one (0.5 g.) in isopropenyl acetate (8 cc.) with p-toluenesulfonic acid (0.08 g.) at 100° for 18 hours and then gradually distill the solvent over a period of 2 hours until the volume is reduced to ca. 2 cc. Dilute the cooled solution with ether (50 cc.) and wash with saturated aqueous sodium bicarbonate and brine. Dry and evaporate the organic solution and adsorb the resultant dark red oil on a column of Florex (25 g.) and elute with benzene-hexane (1:1). Evaporate the eluates and recrystallize from the methanol to obtain the title compound (0.24 g.), M.P. 110–120°; infrared absorption peaks at 5.67, 6.14 and 6.23μ.

This compound is useful as an intermediate for preparing the novel compositions of this invention which have hormonal activity.

EXAMPLE 41

17β-acetoxy - 2,3-dimethoxy - 16,17-epoxy - 13-methyl-8-isogona-1,3,5(10)-triene Treat 17-acetoxy - 2,3-dimethoxy - 13-methyl-8-isogona-1,3,5(10),16-tetraene (0.25 g.) in benzene (5 cc.) with m-chloroperbenzoic acid (0.18 g.) and allow to stand at 25° for 3 hours. Pour into cold aqueous sodium bicarbonate, and wash the organic solution with brine and dry. Remove the solvent and crystallize the residue from acetone to obtain the title compound (0.12 g.) M.P. 152–160°; ultraviolet absorption maxima at 282–290 mμ (ε 3,530); infrared absorption peaks at 5.69 and 6.22μ.

$C_{22}H_{28}O_5$ calcd. (percent): C, 70.94; H, 7.57. Found (percent): C, 71.12; H, 7.62.

This compound is useful as an intermediate for preparing the novel compositions of this invention which have hormonal activity.

EXAMPLE 42

2,3-dimethoxy - 13-methyl-8 - isogona-1,3,5(10) - trien-16α-ol-17-one

Dissolve 17β-acetoxy - 2,3-dimethoxy - 16,17 - epoxy-13-methyl-8-isogona-1,3,5(10)-triene (0.25 g.) in warm methanol (37 cc.) and acetone (9.3 cc.). Cool to 25° and add 6 N sulfuric acid (7.5 cc.). Allow the mixture to stand for four days and then dilute with an equal volume of ethyl acetate. Cool to 0° and basify with ice-cold aqueous sodium bicarbonate. Separate the organic layer, extract the aqueous solution with ethyl acetate and wash the combined organic solutions with water and dry. Evaporate the solvent and recrystallize the residue from methanol to obtain the title compound (0.14 g.), M.P. 203–207°; infrared absorption peaks at 2.89, 5.73, 6.20μ.

$C_{20}H_{26}O_4$ calcd. (percent): C, 72.69; H, 7.90. Found (percent): C, 72.74; H, 8.06.

This compound has estrogenic activity and is useful as an intermediate for preparing the hormonal compounds of this invention.

EXAMPLE 43

2,3-dimethoxy - 13-methyl - 8-isogona - 1,3,5(10)-trien-16α,17β-diol

Add 17β-acetoxy - 2,3-dimethoxy - 16,17-epoxy - 13-methyl-8-isogona-1,3,5(10)-triene (0.25 g.) in dry ether (25 cc.) dropwise to a stirred suspension of lithium hydride (0.7 g.) in ether (75 cc.). Reflux for four hours and then stir at 25° for 16 hours. Decompose the excess lithium aluminum hydride by adding water (1 cc.) cautiously, followed by 15% aqueous sodium hydroxide (1 cc.) cautiously, followed by 15% aqueous sodium hydroxide (1 cc.) and more water (1 cc.). Filter the mixture, evaporate the filtrate and recrystallize the residue from ethyl acetate to obtain the title compound (0.06 g.), M.P. 195–99°; infrared absorption peaks at 3.1, 6.21 and 6.63μ.

This compound has estrogenic activity and is useful as an intermediate for preparing the hormonal compounds of this invention.

EXAMPLE 44

2,3-dimethoxy-13-methyl-8-isogona-1,3,5(10)-trien-16α,17β-diol

Add sodium borohydride (0.5 g.) to a stirred suspension of 2,3-dimethoxy - 13 - methyl-8-isogona-1,3,5(10)-trien-16α-ol-17-one (0.1 g.) in methanol (100 cc.) and continue stirring for 2 hours. Evaporate the methanol under reduced pressure, dissolve the residue in ether-benzene and wash with water and dry. Remove the solvent under reduced pressure and recrystallize the residue from ethyl acetate to obtain the title compound (0.06 g.), M.P. 203–205°; ultraviolet absorption peaks at 225, 285 and 291 mµ (ε 8,960, 3,940 and 3,710); infrared peaks at 3.1, 6.22 and 6.63µ.

$C_{20}H_{28}O_4$ calcd. (percent): C, 72.26; H, 8.49. Found (percent): C, 71.72; H, 8.79.

This compound has estrogenic activity and is useful as an intermediate for preparing the hormonal compounds of this invention.

EXAMPLE 45

3,17-diacetoxy-13-methyl-8-isogona-1,3,5(10)-triene

Reflux 3-acetoxy-13-methyl-8-isogona-1,3,5(10)-trien-17-one (5 g.) with p-toluenesulfonic acid (1.5 g.) in isopropenyl acetate (100 cc.) for 16 hours, and then slowly distill the solvent until ca. 15 cc. remains. Add ether and wash the organic solution with aqueous sodium bircarbonate, water, brine and dry. Evaporate the solvent and recrystallize the residue from ethanol and then benzene-heptane to obtain the title compound, M.P. 113.8–114.8°.

This compound has estrogenic activity and is useful as an intermediate for preparing the hormonal compounds of this invention.

EXAMPLE 46

13-methyl-8-isogona-1,3,5(10)-trien-3,16α,17β-triol

Add m-chloroperbenzoic acid (2.5 g.) to a solution of 3,13-diacetoxy-13-methyl-8-isogona-1,3,5(10),16-tetraene (3.65 g.) in benzene (60 cc.) and stir for 48 hours at 25°. Filter and wash the filtrate with 3% aqueous potassium carbonate, water, brine and dry. Evaporate the solvent, dissolve the residue in tetrahydrofuran (80 cc.) and add the solution to a stirred suspension of lithium aluminum hydride (8 g.) in ether (200 cc.). Stir for 30 minutes and then reflux for 1 hour. Add ethyl acetate (75 cc.) dropwise to the cooled solution, and then 10% hydrochloric acid (200 cc.) and concentrated hydrochloric acid (50 cc.). Separate the organic layer, extract the aqueous solution with ethylacetate and wash the combined organic solution with 10% aqueous sodium bicarbonate, water, brine and dry. Evaporate the solvent and treat the residue with hot methanol and charcoal. Filter, dilute with benzene and filter the precipitate to obtain the title product (0.58 g.). Recrystallize from methanol to obtain a pure sample, M.P. 266–268°; infrared absorption peaks at 3.0–3.3 (broad), 6.22, 6.67µ.

$C_{18}H_{24}O_3$ Calcd. (percent): C, 74.97; H, 8.39. Found (percent): C, 75.15; H, 7.67.

This compound has estrogenic activity and is useful as an intermediate for preparing the hormonal compounds of this invention.

EXAMPLE 47

3-methoxy-13-methyl-8-isogona-1,3,5(10)-trien-16α, 17β-diol

Add m-chloroperbenzoic acid (1.5 g.) to a solution of 17-acetoxy-3-methoxy-13-methyl-8-isogona-1,3,5(10),16-tetraene (1.58 g.) in benzene (50 cc.) and stir the solution at 25° for 45 hours. Filter, wash the filtrate with 3% aqueous potassium carbonate, water, brine and dry. Evaporate the solvent, dissolve the residue in tetrahydrofuran (80 cc.) and add the solution dropwise to a stirred suspension of lithium aluminum hydride (3.5 g.) in ether (200 cc.). Stir for 30 minutes and then reflux for 1 hour. Add ethyl acetate (75 cc.) slowly to the cooled solution followed by 10% hydrochloric acid (200 cc.) and concentrated hydrochloric acid (50 cc.). Separate the organic layer and extract the aqueous solution with ethyl acetate. Wash the combined organic extracts with 10% aqueous sodium bicarbonate, water and brine, and dry and evaporate the solvent. Dissolve the residue in hot methanol, treat with activated charcoal, filter and reduce the volume of filtrate to 10 cc. Cool to 10°, and filter the precipitate to obtain the title compound (0.5 g.). Recrystallize further from ethyl acetate and then from methanol to obtain the pure compound, M.P. 186–187.8°; infrared absorption peaks at 3.1, 6.22, 6.67µ.

This compound has estrogenic activity and is useful as an intermediate for preparing the hormonal compounds of this invention.

EXAMPLE 48

13-methyl-8-isogona-1,3,5(10)-trien-3,17β-diol

Dissolve 3-hydroxy-13-methyl-8-isogona-1,3,5(10)-trien-17-one (9.2 g.) in warm methanol (150 cc.) and tetrahydrofuran (50 cc.), allow to cool to 25°, and then add sodium borohydride (9.0 g.) to the stirred solution in small portions with ice cooling. Stir for 2 hours, evaporate to about 100 cc. and add water (300 cc.). Filter the precipitate and dry. Dissolve in hot methanol, treat with activated charcoal, filter and reduce the volume to 20 cc. Add benzene (20 cc.) and reduce the volume to 30 cc. Allow to stand and then filter the title compound (5.9 g.), M.P. 180–183°. Further purify from ethyl acetate-benzene to obtain the hemihydrate, M.P. 185.5–186.8°. Dry at 105° in vacuo for 6 hours to obtain the pure compound, M.P. 209.5–210.5°.

$C_{18}H_{24}O_2$ calcd. (percent): C, 79.37; H, 8.88. Found (percent): C, 79.16; H, 8.89.

This compound has estrogenic activity and is useful as an intermediate for preparing the hormonal compounds of this invention.

EXAMPLE 49

13-methyl-3-methoxy-8-isogona-1,3,5(10)-trien-17β-ol-hydrogen sulfate, potassium salt Add sulfur trioxide-pyridine complex (2.0 g.) to a solution of 13-methyl-3-methoxy-8-isogona-1,3,5(10)-trien-17β-ol (1.5 g.) in pyridine (15 cc.) and stir the mixture at 100° for 2 hours. Cool, add potassium carbonate (3.5 g.) in water (50 cc.) and stir for 1 hour. Filter the precipitate, wash with water and acetone and dry to obtain the title product (0.91 g.) as a hydrate, M.P. 281–282°.

$C_{19}H_{25}O_5SK \cdot H_2O$ calcd. (percent): C, 54.0; H, 6.44; S, 7.59; K, 9.25. Found (percent): C, 54.34; H, 6.53; S, 6.3; K, 9.8.

This compound has estrogenic activity and is useful as an intermediate for preparing the hormonal compounds of this invention.

EXAMPLE 50

13-methyl-3-methoxy-8-isogona-1,3,5(10)-trien-17β-ol, hydrogen sulfate, potassium salt Stir a mixture of 13-methyl-3-methoxy-8-isogona-1,3,5(10)-trien-17β-ol (2.0 g.) and sulfonic acid (2.0 g.) in pyridine (15 cc.) at 80° for 15 minutes and then at 25° for 1 hour. Add a solution of potassium carbonate (3.0 g.) in water (50 cc.) and stir for a further hour. Filter and dry to obtain the title compound (2.43 g.), M.P. 280–281°. Recrystallize from water to obtain 1.55 g. of product, M.P. 280–281° after drying.

$C_{19}H_{25}O_5SK$ calcd. (percent): C, 56.40; H, 6.23. Found (percent): C, 56.71; H, 6.33.

This compound has estrogenic activity and is useful as an intermediate for preparing the hormonal compounds of this invention.

The subject matter which the applicants regard as their invention is particularly pointed out and distinctly claimed as follows:

1. 13β-methyl-17α-alknyl-8-isogon-5(10)-en-3-one wherein the 17β-position bears a substituent selected from the group consisting of hydroxy, acyloxy, and alkoxy.

2. 13β-methyl-17α-ethynyl-8-isogon-5(10)-en-3-one wherein the 17β-position bears a substituent selected from the group consisting of hydroxy, acyloxy, and alkoxy.

3. A compound of the formula
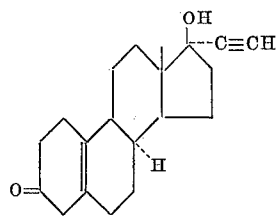
References Cited
UNITED STATES PATENTS
3,046,273 7/1962 Fried et al. _____ 260—239.55
3,189,522 6/1965 Cantrall et al. _____ 167—65
3,262,855 7/1966 Bucourt _____ 167—74
OTHER REFERENCES
Fieser et al., Steroids, pp. 458 and 463 (1959), Reinhold Pub. Co. New York.
Applezweig, Steroid Drugs, p. 123, vol. II (1964), Holden-Day, Inc., San Francisco, Calif.
ELBERT L. ROBERTS, Primary Examiner
U.S. Cl. X.R.
260—239.55, 397.5